United States Patent [19]

Mertens et al.

[11] Patent Number: 4,985,099
[45] Date of Patent: Jan. 15, 1991

[54] PROCESS FOR INCREASING RESISTANCE TO PENETRATION THROUGH A GLAZED OPENING

[75] Inventors: Guy Mertens, Namur; Jean-Jacques Reydams, Chaumont-Gistoux; Michel Wasterlain, Courcelles, all of Belgium

[73] Assignee: Glaverbel, Brussels, Belgium

[21] Appl. No.: 359,567

[22] Filed: Jun. 1, 1989

[30] Foreign Application Priority Data

Jun. 15, 1988 [LU] Luxembourg ............................ 87241

[51] Int. Cl.$^5$ ............................................. B32B 35/00
[52] U.S. Cl. ......................................... 156/94; 52/789; 65/106; 65/114; 156/102; 156/106; 156/108
[58] Field of Search .................... 52/789; 65/106, 114; 156/94, 99, 102, 106, 108, 212

[56] References Cited

U.S. PATENT DOCUMENTS

| 3,558,415 | 1/1969 | Rieser et al. |
|---|---|---|
| 4,842,664 | 6/1989 | Baudin ............................... 156/102 |

FOREIGN PATENT DOCUMENTS

| 1275653 | 5/1972 | United Kingdom . |
|---|---|---|
| 1283695 | 8/1972 | United Kingdom . |
| 2124548 | 2/1984 | United Kingdom . |

*Primary Examiner*—Robert A. Dawson
*Attorney, Agent, or Firm*—Spencer & Frank

[57] ABSTRACT

A process for increasing resistance to penetration of glass in a glazed opening, including removing the glass from the glazed opening; and replacing the glass by laminated glazing consisting of the glass removed to which is fastened, by cementing with the aid of at least one intermediate layer of thermoplastic material, a sheet of thinner glass which has dimensions substantially equal to those of the glass removed except for having a thickness which is less than that of the glass removed, and which has been subjected to a chemical tempering treatment.

8 Claims, 1 Drawing Sheet

PROCESS FOR INCREASING RESISTANCE TO PENETRATION THROUGH A GLAZED OPENING

BACKGROUND OF THE INVENTION

Field of the Invention

The present invention relates to a process for increasing resistance to penetration through a glazed opening, and also to glazing having break-in resistance reinforced by lamination.

Glazed openings equipped with single glazing of standard thickness, comprising for example a sheet of 4 millimeter glass, generally do not possess great resistance to penetration even if the glass has undergone thermal tempering treatment. A thief or vandal equipped with relatively simple means, such as a crowbar or sledgehammer, will not need much time to overcome the obstruction offered by such glazing and commit his misdeed. This is for example the case with ordinary door and window glazing in buildings such as dwellings. Another field requiring particular attention at the present time is that of motor vehicles or caravans, for example residential caravans. The ordinary glazing of a standard vehicle cannot long withstand the attention of a vandal. A thief can relatively easily break the side windows of the vehicle, which are generally in the form of single glass panes, and steal some of its contents or even the vehicle itself.

It is true that armoured windows or armoured vehicles exist in which the glazing is even bullet-proof. It is however quite clear that such glazing is very expensive, that it is heavy, and that in addition it needs a special frame or casing to receive its great thickness. In the case of a vehicle, for example, the extra cost required to improve the protection of the vehicle and its contents soon becomes very substantial. In any case, it may be very difficult or even impossible to fit armoured glazing of this kind to an ordinary standard production model of a vehicle.

The time required to break into the space enclosed by the glazed opening may be a determining element for the success or failure of the break-in. Lengthening this time is certainly a deterrent factor.

SUMMARY OF THE INVENTION

One of the main objects of the present invention is to provide a process for increasing resistance to penetration through a glazed opening in such a manner as to lengthen the time required for penetration, without incurring great extra cost for this additional protection.

The present invention provides a process for increasing resistance to penetration through a glazed opening, wherein the glass is removed from this glazed opening and replaced by laminated glazing consisting of the glass removed or a pane of substantially identical geometry (hereinafter referred to as the "original glass pane") to which is fastened, by cementing with the aid of at least one intermediate layer of thermoplastic material, a sheet of thinner glass cut out to have dimensions substantially equal to those of the original glass pane and which has been subjected to chemical tempering treatment.

The process according to the invention is very simple and easy to carry out, and it thus makes it possible to control at least one of the important parameters governing resistance to penetration through the glazed opening, since it acts directly on the sensitive element constituted by the glazing. This process is also very flexible, because it can easily be adapted to different shapes of the original glass pane, which can itself be used as a model or pattern. In the case of the motor vehicle trade, the adaptation can easily be attended to by a coachbuilder, and the process according to the invention does not require a large number of templates to match the numerous shapes of vehicle windows existing on the motor vehicle market.

It is very surprising to remove the glass pane from a glazed opening, to cement a thinner sheet of glass to the original glass pane and to put the resulting laminated glazing back in the opening for the purpose of increasing resistance to penetration. The modification of the original glass pane resulting therefrom entails increased thickness, which at first sight would appear to prevent normal reinsertion of the glazing inside its seating in the glazed opening. It is also unexpected, because of the risk of impairing the optical properties of the glazed opening, which is very often an important if not primordial factor for a glazed opening, since the latter is generally intended to be perfectly transparent. The Applicants have found that the process according to the invention can result in a substantial reinforcement of resistance to penetration through the glazed opening with a low cost of the work done, without substantial modification of the glazing seating and, provided that the cementing is carried out carefully and the sheet of thinner glass is of good optical quality, without significant modification of the optical properties of the glazed opening, while the appearance of the original glass pane is retained. The presence of a chemically tempered glass makes an important contribution to the increase of penetration resistance of the resulting laminated glazing. In addition, chemical tempering preserves the optical properties.

It is advantageous for the thickness of the sheet of thinner glass to be less than 2 millimeters, and preferably less than 1.5 millimeter. The thickness and weight of the original glass pane are consequently very little modified by this additional sheet of glass. The process is easier to carry out in respect of the refitting of the original glass pane.

The process according to the invention is particularly advantageous when the original glass pane is a curved pane. In modern motor vehicles, for which there are numerous applications of the process according to the invention, the glazing, including side glazing, is generally curved. It is possible to apply the sheet of thinner glass, previously cut to the required dimensions, to the original glass pane, which thus serves as mould in a curving oven, and to withdraw it sufficiently quickly for the thinner sheet to be curved and to assume a shape matching that of the original glass pane. This, however, entails the risk of deformation of the original glass pane, and is possible only if the difference in thickness between the two sheets of glass is sufficient. It is also possible to place the sheet of thinner glass on a suitably shaped mould and to pass it through a curving oven in the conventional manner, before it is cemented to the original glass pane.

However, the original glass pane is preferably a curved pane to which is fastened a thinner plane sheet of glass which is curved in the cold state during the cementing, so as to match the shape of the original glass pane. This process is very simple. It avoids the heating of the glass sheet in order to curve it, and therefore also the loss of surface compressive stresses caused by the tempering, as well as the reduction of mechanical strength. It also avoids the cost of calorific energy required for heating. Moreover, it does not require the provision and the operation of an expensive curving equipment and the stocking of numerous cumbersome and expensive moulds of different shapes.

It is astonishing that the cold curving of a sheet of glass is possible in this way and that it can be held by cementing in this way without risk of spontaneous fracture in the course of time, particularly when subjected to shocks, such as the slamming of a door. It is also completely unexpected to proceed in this way, because it could normally be expected that the curvature of the original pane of glass would be reduced by the force induced by the cold curved plane glass sheet, which tends to resume the plane state, and that consequently the resulting curvature of the laminated pane would be different from the curvature of the original glass pane. Furthermore, in practice a thin glass sheet which is kept curved very often undergoes spontaneous fracture in the course of time.

It has surprisingly been found that with a thin chemically tempered sheet it is possible in this way to obtain a laminated structure which respects the curved appearance of the original glass pane, while imparting to it a substantially improved resistance to break-in. In this way at least the convex face of the original glass pane is placed in compression by the lamination operation. Provided that this convex face is judiciously disposed in the outer position on the side exposed to possible attack, this feature also improves break-in resistance. Chemical tempering gives the thin glass sheet sufficient mechanical strength to prevent spontaneous fracture.

This thinner sheet of glass can be cut to dimensions slightly smaller than those of the original glass pane before the cementing operation takes place. In this way, the marginal portion of the pane is not modified by the lamination operation, and the resulting pane can be placed in the same frame as the original pane if this frame is a very close fit to the thickness of the pane. However, the thinner glass sheet is preferably cut to dimensions substantially identical to those of the original glass pane before the cementing operation takes place. Lamination is then easier, because the sheets to be joined have the same dimensions and resistance to penetration is improved for the reason that the entire original glass pane is reinforced, without any weak point at the edges.

Before the cementing operation, it is advantageous for the original pane to be subjected to treatment for reinforcing its mechanical strength, in such a manner that in the event of fracture at least one of the dimensions of the fragments formed will on the average be greater than 5 centimeters. It can thus be ensured that on the one hand the original glass pane will have high impact strength, and that on the other hand, in the event of breakage, the mass of fragments formed, held in place by the intermediate layer of thermoplastic material, will still offer great resistance to penetration.

If the original glass pane is a thermally tempered sheet, the latter is preferably freed from temper before the previously mentioned treatment for reinforcement of its mechanical strength. The risk of the formation of very small fragments, which would deprive the sheet of all rigidity, if the original glass pane is broken during a break-in, is thus avoided. In conjunction with the lamination, the resulting glazing retains good rigidity in the event of the fracture of the original glass pane, and it still forms an obstacle to penetration, so that the time necessary for a break-in is lengthened.

The original glass pane is advantageously subjected to chemical tempering treatment. Chemical tempering is a particularly effective mechanical strength improvement treatment for providing glass with very high impact strength, for example markedly higher than in the case of hardening treatment, while optical properties are not endangered. Moreover, the advantage is gained that relatively large fragments are formed in the event of the fracture of the sheet. A said original glass pane which has been thermally tempered can easily be freed from temper, if required, during the preheating needed for the chemical tempering operation. Two operations are thus carried out in one.

According to preferred embodiments of the invention, for the formation of the laminated pane a sheet of polycarbonate is inserted between the original glass pane and the sheet of thinner glass, and is also bonded by cementing with the aid of an intermediate layer of thermoplastic material. By means of a simple process it is thus possible to increase still more substantially the resistance to penetration, while retaining the resistance to abrasion specific to glass at least on an outer face of the resulting pane. The whole assembly can be bonded in a simple manner in a single operation, as in the case of a single layer of thermoplastic material, despite the addition of extra sheets. The material of the intermediate layer used in such a case is advantageously polyurethane, preferably with a thickness of at least 0.38 millimeter, for example an interposed film of about 1 to 2 millimeters, so as to retain favourable optical properties. The disadvantages which must be accepted in order to increase total thickness are amply compensated by the greatly improved resistance to penetration.

The invention also extends to glazing having resistance to break-in improved by a process such as that described above.

The present invention also relates to glazing having resistance to break-in improved by lamination, and characterized in that it comprises a glass pane (hereinafter referred to as "original glass pane") of a thickness of at least 3 millimeters and originally intended for glazing an opening, to which pane a thinner sheet of glass, the thickness of which is less than 2 millimeters and which has undergone chemical tempering treatment, is fastened by lamination with the aid of an interposed layer of thermoplastic material, the thickness of which is greater than half the thickness of the sheet of thinner glass.

This sheet of glass fastened by lamination to the original glass pane is thin, so that the extra weight and increased dimensions of the glazing according to the invention, relative to the original glass pane, are greatly limited.

It is very surprising that so thin a sheet, compared with the thickness of the original glass pane, can furnish a sufficiently appreciable improvement to justify a lamination operation. It has however been found that glazing according to the invention offered markedly better resistance to attempted penetration through the glazed opening equipped with this glazing, and also for example to projectiles thrown against the glazed opening. The combination of this chemically tempered sheet with the interposed layer of thermoplastic material of not negligible thickness, the resulting assembly forming the base of a laminated material, provides a very substantial improvement of the break-in resistance of the glazing according to the invention, in comparison with the original glass pane.

This sheet of thinner glass is advantageously placed in an external position in the glazing. The external face formed by the lamination has very good resistance to scratching and abrasion and is very stable over a long period of time, since it consists of glass.

The original glass pane is preferably curved. The glazing according to the invention is then likewise curved. It is in that way that the best results are achieved in respect of the improvement of break-in resistance. Furthermore, the glazing according to the invention can thus be used as motor vehicle glazing, which is a preferred field of application of the present invention, and is suitable for models having large areas of glazing.

Curved glazing is considered as a particularly advantageous aspect of the present invention, and as a source of numerous applications in which the invention makes a beneficial contribution.

When the glazing is curved, the original glass pane is advantageously placed under compression by the lamination. In this way the impact strength of the original glass pane is increased and, if fracture occurs, the various fragments formed are held one against the other at the fracture lines. Even in the event of the fracture of the original glass pane, the glazing consequently remains an obstacle to penetration. Since in addition the fracture of a sheet of glass generally gives rise to a slight increase of the spatial dimensions of the sheet, the latter tends to become wedged in its frame. If the convex face of the glazing is placed under compression and judiciously disposed on the side from which the attack may be made, this substantially lengthens the time required to make the break-in.

The thickness of the thinner sheet of glass is preferably at most equal to 1.5 millimeter. A thin sheet of glass of this kind permits a substantial improvement of resistance to break-in through a minimal increase of the thickness and weight of the glazing. Its thickness will for example advantageously be about 1.2 to 1.4 millimeter. Chemical tempering gives this very thin sheet of glass a high mechanical strength and permits cold curving.

The periphery of this thinner sheet of glass can be set back relative to the periphery of the glazing as a whole. Consequently, the marginal portion of the thinner sheet of glass need not necessarily be inserted into the frame. Only the marginal portion of the original glass pane, for example, may be inserted into the frame. Glazing of this kind according to the invention can thus advantageously replace an original glass pane whose seating is a very close fit, without any modification of the frame or of the seal being required. With minimum investment costs it is thus possible to increase resistance to penetration by lengthening the time required to break the glazing, as compared with the time which would be necessary with the original glass pane, and this is generally a deterrent. It is however preferable for the thinner sheet of glass to be of the same dimensions as the original glass pane, because its marginal portion can thus also be received in the frame when the glazing is installed in the opening, thus improving resistance to penetration through the glazed opening, since the rigidity of the glazing is increased. The slight increase in thickness allowed with the glazing according to the invention avoids the modification of the frame in the majority of applications, and, if necessary, the seal can easily be adapted in a simple manner.

The thinner sheet of glass can for example be cemented to the original glass pane with the aid of an interposed 0.38 millimeter film of commercial polyvinyl butyral. However, for preference, the thickness of the interposed layer of thermoplastic material is greater than 1 millimeter. An interposed layer of this kind holds the fragments of the glass sheets together more effectively when fracture occurs as the result of a break-in attempt, because it tears less easily, so that it participates favourably in lengthening the time required for the break-in. It also makes it possible for part of the energy of the shocks caused by the attack to be absorbed. A thickness of 1 to 2 millimeters is particularly favourable.

The original glass pane has advantageously undergone treatment for increasing its mechanical strength, so that in the event of fracture at least one of the dimensions of the fragments formed will on the average be greater than 5 centimeters. Consequently, in the event of fracture, the fragments formed, which are held one against the other by the lamination, together form an obstacle to penetration, thus retarding completion of the break-in, because the glazing as a whole remains rigid and cannot easily be driven in. Furthermore, the treatment for improving mechanical strength makes the fracture of the sheet through impact and through bending more difficult.

This treatment for improving mechanical strength may for example be hardening heat treatment. Such treatment gives the glass sheet improved impact strength compared with an ordinary sheet. In the event of attack, a sheet treated in this manner breaks into relatively large pieces, unlike a thermally tempered sheet which breaks into very small fragments and consequently no longer has much rigidity. Preferably, however, this treatment for improving mechanical strength is a chemical tempering treatment. A glass sheet treated in this manner has very high impact strength and, if fracture occurs, most of the sheet will break into relatively large fragments. These fragments are generally rods of a width of about 1 to 2 centimeters, with a length at least equal to half the dimension of the sheet along which they extend. Each fragment still has high impact strength and the whole assembly, held in place by the lamination, still offers resistance to penetration, thus substantially lengthening the time required for breaking into the space protected by the glazing according to the invention.

The glazing according to the invention may for example simply consist of two chemically tempered glass sheets, one of 3 millimeters and the other of 1.2 millimeter, the two sheets being joined together by an interposed layer of polyvinyl butyral, preferably of about 2 millimeters.

According to another advantageous embodiment of the invention, a polycarbonate sheet is sandwiched between the original glass pane and said thinner glass sheet and is secured with the aid of interposed layers of thermoplastic material. A polycarbonate sheet of this kind gives the glazing assembly particularly great rigidity when the original glass pane is broken by the break-in attempt, so that even in this case it is very difficult to break through the glazing and penetrate through the glazed opening. The glazing according to the invention thus has markedly improved break-in resistance. The original glass pane may consequently be composed of thermally tempered glass, since the cohesion of the whole arrangement is ensured by the polycarbonate sheet when the original glass pane is broken. Furthermore, the glass sheets disposed one on each side eliminate the problem of the low scratch resistance of polycarbonate. The inserted sheets of thermoplastic material preferably consist in this case of polyurethane, and they preferably have a thickness greater than 0.38 millimeters, advantageously a thickness between 1 and 1.5 millimeter. Despite the presence of a polycarbonate sheet, which may well be of irregular thickness, it has surprisingly been found that the optical properties of glazing according to the invention of this kind were very good. The thick layer of polyurethane in fact absorbs variations in thickness of the polycarbonate. The polycarbonate sheet may for example have a thickness between 1 and 2 millimeter.

The glazing according to the invention preferably constitutes glazing for a glazed opening in a motor vehicle. It is in this particular field of use that the invention offers the greatest advantages. In this case, the original glass pane is a sheet having the thickness and shape of an original pane of the vehicle, to which said thinner sheet of glass is bonded. The glazing according to the invention can thus easily replace the original glass pane and provide additional protection against penetration into the interior of the vehicle. It may for example constitute a side pane, a rear window or even an opening roof. The glazing according to the invention can easily substantially respect the original appearance from the point of view of colour and light transmission. It is however also easy to give it a different tint from the original, if so desired. The glazing according to the invention can also improve the protection of the network of heating elements of a heatable rear window, for example, because these heating elements can be inside the laminated pane formed.

The aspect relating to the reinforcement of an original glass pane of an automobile vehicle meets a need and provides a particularly effective solution to this problem, while being simple and inexpensive.

The invention consequently extends to a motor vehicle in which at least one of the original glass panes has been replaced by glazing such as that described above, and to a motor vehicle whose resistance to penetration through at least one of its glazed openings has been improved by a process such as that described above.

Especially in the case that the original glass sheet is a toughened or tempered sheet, it is preferred that the glazing be mounted in a vehicle so that the original sheet is at the exterior of the vehicle.

BRIEF DESCRIPTION OF THE DRAWINGS

The invention will now be described, solely by way of example, in greater detail and with reference to the accompanying schematical drawings, in which.

DESCRIPTION OF THE PREFERRED EMBODIMENTS

Figure 1:
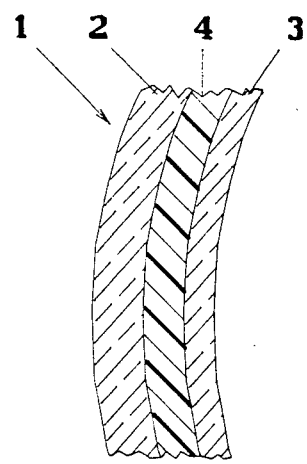
FIG. 1 is a partial section through glazing according to the invention.

In FIG. 1 the glazing 1 comprises an original glass pane 2, to which a thinner sheet of glass 3 has been fastened by lamination with the aid of an interposed layer 4 of thermoplastic material. The thinner glass sheet 3, which is in the outer position for the glazing 1, has a thickness of 1.2 millimeter. The interposed layer 4 is a layer of polyvinyl butyral of a thickness of 2 millimeters. The glass sheets 2 and 3 have both undergone chemical tempering treatment.

EXAMPLE 1

In order to produce the glazing shown in FIG. 1, the curved side pane 2 was dismantled from a motor vehicle. This pane 2 has a thickness of 3 millimeters and had originally been subjected to thermal tempering treatment. It was first subjected to chemical tempering treatment by immersion for 24 hours in a potassium nitrate bath kept at a temperature of 450° C. During the preheating preceding the chemical tempering, the pane was freed from temper. The chemical tempering provides the treated pane with improved mechanical strength in comparison with the original pane, without loss of optical quality. It has the additional advantage that, when fractured, it breaks into large pieces which still offer effective resistance to penetration, since they are held together by the interposed layer 4 of polyvinyl butyral when the glazing 1 is formed.

A sheet of 1.2 millimeter glass was cut to the dimensions of the original glass pane 2 to form the thinner glass sheet 3, and the edges were ground to avoid sharp edges. This sheet 3 was also subjected to chemical tempering treatment in the same way as the sheet 2.

A sandwich was then formed comprising the original pane 2 and the thinner glass sheet 3, separated by the interposed layer 4 of polyvinyl butyral. This sandwich was fastened together by cementing with the aid of the interposed layer, in a manner known per se by the lamination technique, such as for example the technique described in Belgian Patent No. 779,912, and the laminated glazing 1 was obtained. The thinner glass sheet 3, which was previously plane, was cold curved at the moment when the laminated pane was formed by cementing the sandwich, in order to cause it to match the shape of the original glass pane 2. The expression "cold curved" means that the temperature of the sheet was not sufficiently high for the glass to undergo permanent deformation. This is the case when cementing is effected at between 100° and 150° C. The original glass pane 2, or at least its convex outer face, was placed under compression as the result of the lamination operation.

The resulting glazing 1 has a total thickness of 6.2 millimeters. It was put back in its seating on the vehicle without any significant modification of the seating being required, apart from slight adaptation of the seal. When an attempt was made to penetrate into the interior of the vehicle, it withstood at least 5 blows from a crowbar and, after fracture of the glass sheets, it was still not possible for a sphere of a diameter of 40 millimeters to penetrate through the glazing, that is to say it was not possible to pass a hand into the interior of the vehicle. Furthermore, it was not found possible to remove it from its seating within 4 minutes.

As a variant of this example of embodiment, the glass pane 2 was a heatable rear window. The procedure was the same as above, except that the original glass pane was not subjected to chemical tempering. In this case the heating element network is protected by the interposed layer 4 and the thinner outer glass sheet 3.

EXAMPLE 2

Figure 2:
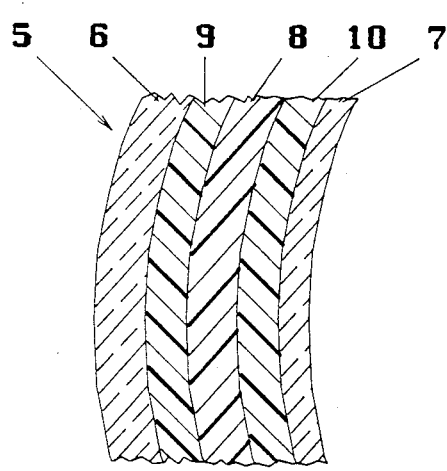
FIG. 2 is a partial section of another example of construction of glazing according to the invention.

This example was carried out in accordance with FIG. 2. In this figure the glazing 5 is composed of an original glass pane 6, to which a thinner glass sheet 7 is fastened. Between these two sheets a polycarbonate sheet 8, separated on each side from the glass sheets by an interposed layer 9 and 10 of polyurethane, was intercalated.

For the purpose of producing this glazing, the heatable rear window 6 comprising a thermally tempered 3 millimeter glass sheet 6 was removed from a motor vehicle. It should be noted that in this case the sheet 6 was not freed from temper and was not subjected to chemical tempering. A sheet of 1.2 millimeter glass was cut to the dimensions of the original glass pane 6 to form the thinner glass sheet 7. The edges of the thinner sheet 7 were ground to avoid sharp edges, and that sheet was subjected to chemical tempering treatment.

A sandwich was then formed comprising the original glass pane 6 and the thinner glass sheet 7, separated by the polycarbonate sheet 8, which had a thickness of 2 millimeters and which was enclosed on each side by an interposed layer 9 and 10 of polyurethane of a thickness of 1.25 millimeter. This sandwich was joined together by cementing with the aid of the interposed layers 9 and 10 in a manner known per se by the lamination technique, and the laminated glazing 5 was obtained. The glass sheet 7, which was previously plane, was cold curved at the moment when the laminated glazing was formed by cementing the sandwich, in order to cause it to match the shape of the original pane 6. The convex outer face of the original glass pane 6 was placed under compression as the result of the lamination operation.

The resulting laminated glazing 5 has a total thickness of 8.7 millimeters. It was put back in its seating on the vehicle. This operation made it necessary to adapt the seal and the trim, without presenting any particular difficulties. When an attempt was made to penetrate through the opening equipped with this glazing, the vehicle remained closed. In the event of the fracture of the first glass sheet 6, the polycarbonate sheet ensures great rigidity of the glazing. Moreover, the external faces of the glazing are glass surfaces and thus have very great resistance to abrasion.

We claim:

1. A process for increasing resistance to penetration of glass in a glazed opening, the process comprising:
   removing the glass from the glazed opening; and
   replacing the glass by laminated glazing consisting of the glass removed to which is fastened, by cementing with the aid of at least one intermediate layer of thermoplastic material, a sheet of thinner glass which has dimensions substantially equal to those of the glass removed except for having a thickness which is less than that of the glass removed, and which has been subjected to a chemical tempering treatment.

2. Process according to claim 1, wherein the thickness of said sheet of thinner glass is less than 2 millimeters.

3. A process for increasing resistance to penetration of glass in a glazed opening, the process comprising:
   removing the glass from the glazed opening; and
   replacing the glass by laminated glazing consisting of the glass removed or a pane of substantially identical geometry (hereinafter referred to as the "original glass pane") to which is fastened, by cementing with the aid of at least one intermediate layer of thermoplastic material, a sheet of thinner glass which has dimensions substantially equal to those of the original glass pane except for having a thickness which is less than that of the original glass pane, and which has been subjected to a chemical tempering treatment,
   wherein said original glass pane is a curved pane to which a plane sheet of thinner glass is fastened, and said sheet of thinner glass is cold curved during cementing in order to match the shape of said original glass pane.

4. Process according to claim 1, wherein before the cementing said original glass pane is subjected to treatment for improving its mechanical strength, so that in the event of fracture at least one of the dimensions of the fragments formed will on the average be greater than 5 centimeters.

5. Process according to claim 4, wherein said original glass pane is a sheet of thermally tempered glass, and said sheet is previously freed from temper before undergoing said treatment for improving its mechanical strength.

6. Process according to claim 4, wherein said original glass pane is subjected to chemical tempering treatment before said laminated glazing is formed.

7. Process according to claim 1, wherein in forming said laminated glazing a sheet of polycarbonate, likewise fastened by cementing with the aid of an interposed layer of thermoplastic material, is interposed between said original glass pane and said sheet of thinner glass.

8. Process according to claim 2, wherein the thickness of said sheet of thinner glass is less than 1.5 millimeter.

* * * * *